(12) United States Patent
Laredo

(10) Patent No.: US 9,501,431 B1
(45) Date of Patent: Nov. 22, 2016

(54) REMOTE CONTROL MONITORING OF DATA CENTER EQUIPMENT

(71) Applicant: Google Inc., Mountain View, CA (US)

(72) Inventor: Nathan Isaac Laredo, Mountain View, CA (US)

(73) Assignee: Google Inc., Mountain View, CA (US)

( * ) Notice: Subject to any disclaimer, the term of this patent is extended or adjusted under 35 U.S.C. 154(b) by 605 days.

(21) Appl. No.: 14/018,937

(22) Filed: Sep. 5, 2013

(51) Int. Cl.
*G06F 13/16* (2006.01)

(52) U.S. Cl.
CPC .................................. *G06F 13/16* (2013.01)

(58) Field of Classification Search
CPC ....................................................... G06F 13/16
See application file for complete search history.

(56) References Cited

U.S. PATENT DOCUMENTS

| | | | |
|---|---|---|---|
| 7,757,272 B1* | 7/2010 | Dean ................ | H04L 29/12396 713/162 |
| 2002/0199130 A1* | 12/2002 | Kuo ..................... | G11C 29/76 714/6.13 |
| 2009/0157979 A1* | 6/2009 | Gregg ................ | G06F 12/0897 711/141 |
| 2009/0222655 A1* | 9/2009 | Martinent ........... | H04L 63/0853 713/150 |
| 2010/0011116 A1* | 1/2010 | Thornton ............... | H04L 67/36 709/230 |
| 2011/0262134 A1* | 10/2011 | Armstrong ........... | H04L 49/357 398/45 |
| 2012/0260022 A1* | 10/2012 | Ittah .................... | G06F 12/0238 711/103 |

* cited by examiner

*Primary Examiner* — Glenn A Auve
(74) *Attorney, Agent, or Firm* — Lerner, David, Littenberg, Krumholz & Mentlik, LLP

(57) ABSTRACT

A method and apparatus are provided to enable the remote management of software that is otherwise limited to using local input/output (I/O) only. According to the method and apparatus, a microcontroller is installed on a system board of a server and configured to listen to write requests directed to a first I/O interface. When such requests are detected, data that is part of such requests is intercepted and transmitted over a second I/O interface that is different from the first I/O interface.

18 Claims, 10 Drawing Sheets

REMOTE CONTROL MONITORING OF DATA CENTER EQUIPMENT

BACKGROUND

Data centers typically comprise a large number of servers and other communications equipment. Data center equipment may be managed either locally or remotely. In instances where local management is used, the data center equipment may be connected to console terminals having a screen for video and a keyboard for user input, or using a legacy serial port where the user input and the console output go through the same serial connection. When remote management is used, the equipment may be connected via a communications network to a remote management terminal. The remote management terminal may be used by administrators to remotely modify configuration settings of the data center equipment over the communications network. In some instances, however, software running on data center equipment may lack remote management capabilities. Such software may be capable of local input/output (I/O) only, such as via a serial port, and it may necessitate network administrators to physically walk up to the equipment executing the software and use a console to make changes to the software's configuration. Administering software in such a manner may be costlier and more time consuming than administering software remotely.

Existing methods for providing remote access may utilize a "BMC" (baseboard management controller) which itself knows how to act as a real video device and/or as a serial port. FIGS. 4 and 5 described below are examples BMC's of the prior art. These devices also contain logic that knows how to proxy through another interface (like network) so that one could have remote access to the real video device or real serial port.

SUMMARY

In one aspect, a method and apparatus are provided that may enable the remote management of software that is limited to using local I/O only. A microcontroller may be installed on a system board of a computing device and configured to listen to write requests directed to a first type of I/O device that is part of the system board. When such requests are detected, data that is part of such requests is intercepted and transmitted over a second interface that is different from the first interface. In that regard, data that is intended to be transmitted through a serial connection may be intercepted and routed via a network connection to a remote managing terminal thereby enabling the remote management of the server.

One aspect of the disclosure provides a method for transmitting data. The method includes accessing memory storing a predetermined memory address; monitoring read and write operations on a bus initiated by a processor, each memory read and write operation being associated with a first I/O interface and including a destination address and a data portion; determining, by a processor, whether the destination address associated with a given memory read and write operation of the memory read and write operations corresponds to the predetermined memory address; when the destination address associated with the given bus read and write operation corresponds to a predetermined memory address, transmitting the intercepted data, via a second I/O interface and the communications network, to a managing terminal for processing, wherein the second I/O interface is different from the first I/O interface; and receiving instructions over the second I/O interface for how to proceed further in transactions over the bus related to the given bus read and write operation.

In one example, the predetermined memory address is specified based on user input received via the second I/O interface. In another example, the first I/O interface is a serial port. In another example, the second I/O interface is a Universal Serial Bus (USB) interface.

Another aspect of the disclosure provides a system. The system includes a server connected to the managing terminal via a communications network. The server includes a first input/output (I/O) interface, a microcontroller, a second input/output (I/O) interface, a memory storing a predetermined memory address, and a processor coupled to the memory and the microcontroller, wherein the second I/O interface is different from the first I/O interface. The microcontroller is configured to monitor memory write operations initiated by the processor, each memory write operation being associated with the first I/O interface and including a destination address and a data portion; determine whether the destination address associated with a given memory write operation of the memory write operations corresponds to the predetermined memory address; when the destination address associated with the given memory write operation corresponds to the predetermined memory address, transmit the intercepted data, via the second I/O interface and the communications network, to a managing terminal.

In one example, predetermined memory address is specified via user input received over the communications network. In another example, the first I/O interface is a serial port. In another example, the first I/O interface is a graphics port and the write request is executed by the processor as part of a VGA print operation. In another example, the microcontroller is also configured to receive data from the managing terminal; store the data at a predetermined memory location associated with the first I/O interface; and raise an interrupt indicating that the data has been received at the first I/O interface. In another example, the microcontroller is connected to a system bus that is part of a data path connecting the processor to the first I/O interface. In another example, the predetermined memory address is one of a port address or a random access memory address. In another example, the system also includes the managing terminal configured to manage a plurality of servers in a data center.

A further aspect of the disclosure provides a method for transmitting data. The method includes accessing memory storing a predetermined memory address; monitoring memory write operations initiated by a processor, each memory write operation being associated with a first I/O interface and including a destination address and a data portion; determining, by a processor, whether the destination address associated with a given memory write operation of the memory write operations corresponds to the predetermined memory address; when the destination address associated with the given memory write operation corresponds to a predetermined memory address, transmitting the intercepted data, via a second I/O interface and the communications network, to a managing terminal, wherein the second I/O interface is different from the first I/O interface.

In one example, the predetermined memory address is specified based on user input received via the second I/O interface. In another example, the first I/O interface is a serial port. In another example, the first I/O interface is a graphics port and the write operation is executed by the processor as part of a VGA print operation. In another example, the second I/O interface is an Ethernet interface. In another example, the second I/O interface is a Universal Serial Bus (USB) In another example, the predetermined memory address is one of a port address or random access memory address. In another example, the data bus is a low pin count bus.

DETAILED DESCRIPTION

Figure 1:
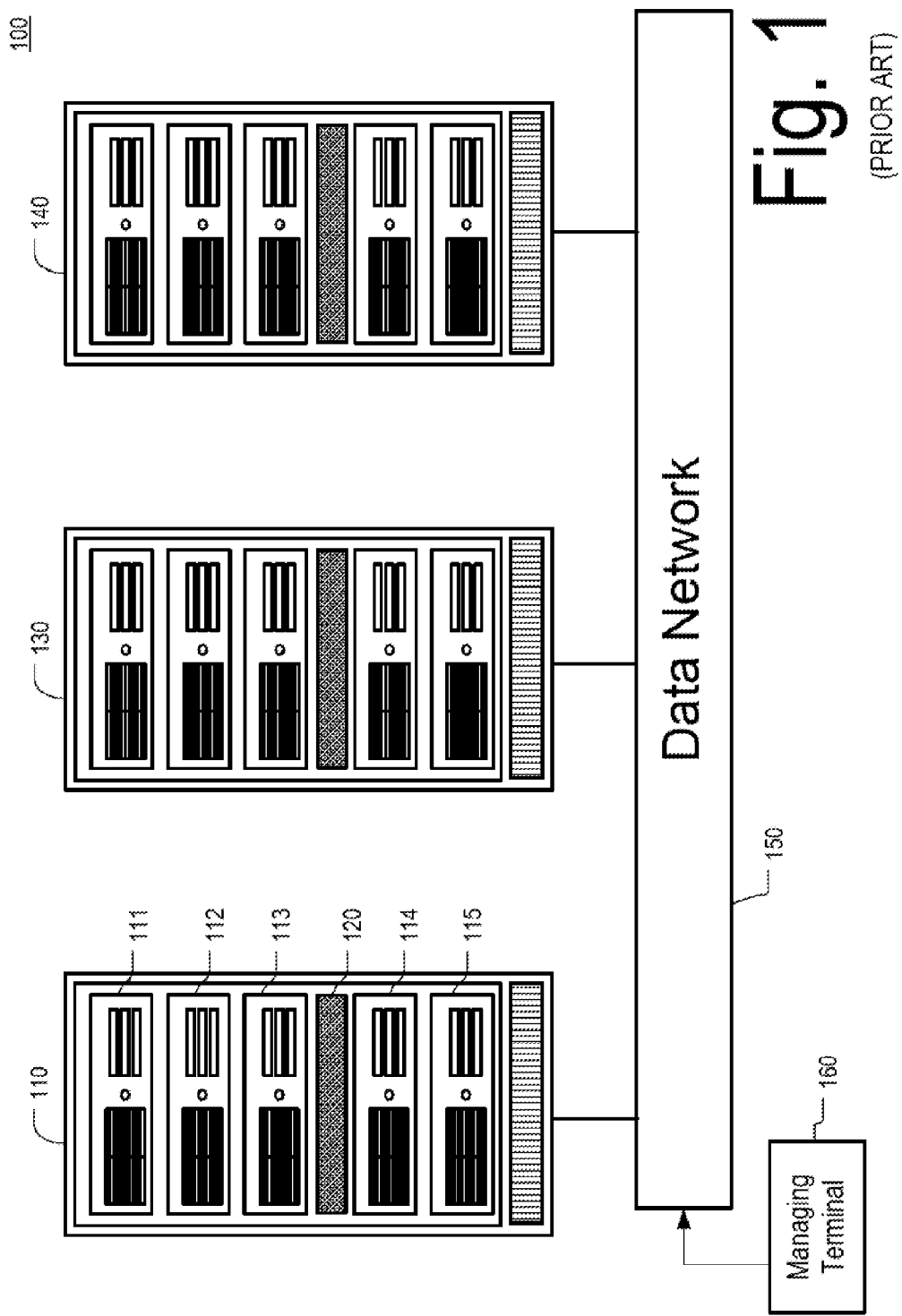
FIG. 1 depicts a schematic diagram of a conventional data center of the prior art.

FIG. 1 depicts a schematic diagram of a known data center 100. The data center 100 may include server racks 110, 130 and 140, a communications network 150, and a managing terminal 160. The server rack 110 may include the servers 111-115 and a console 120. The console 120 may be connected to the servers via a serial port, USB, or another type of connection. The console 120 may include a keyboard, a mouse, and a monitor. The keyboard and mouse may be used to provide input to the servers 111-115. The monitor may be used to display information output by the servers. The console 120 may be connected to the servers 111-115 by using a serial port switch, or another switching device, and it may be used by data center personnel to locally manage the servers. The managing terminal 160 may be a computing device comprising a processor, memory, as well as other components typically found in computer equipment. The managing terminal 160 may be connected to the servers 111-115 via network 150. The network 150 may be a TCP/IP, 802.11, Ethernet, or InfiniBand network. The managing terminal 160 may be used to remotely manage software running on the servers in the data center 100.

Figure 2:
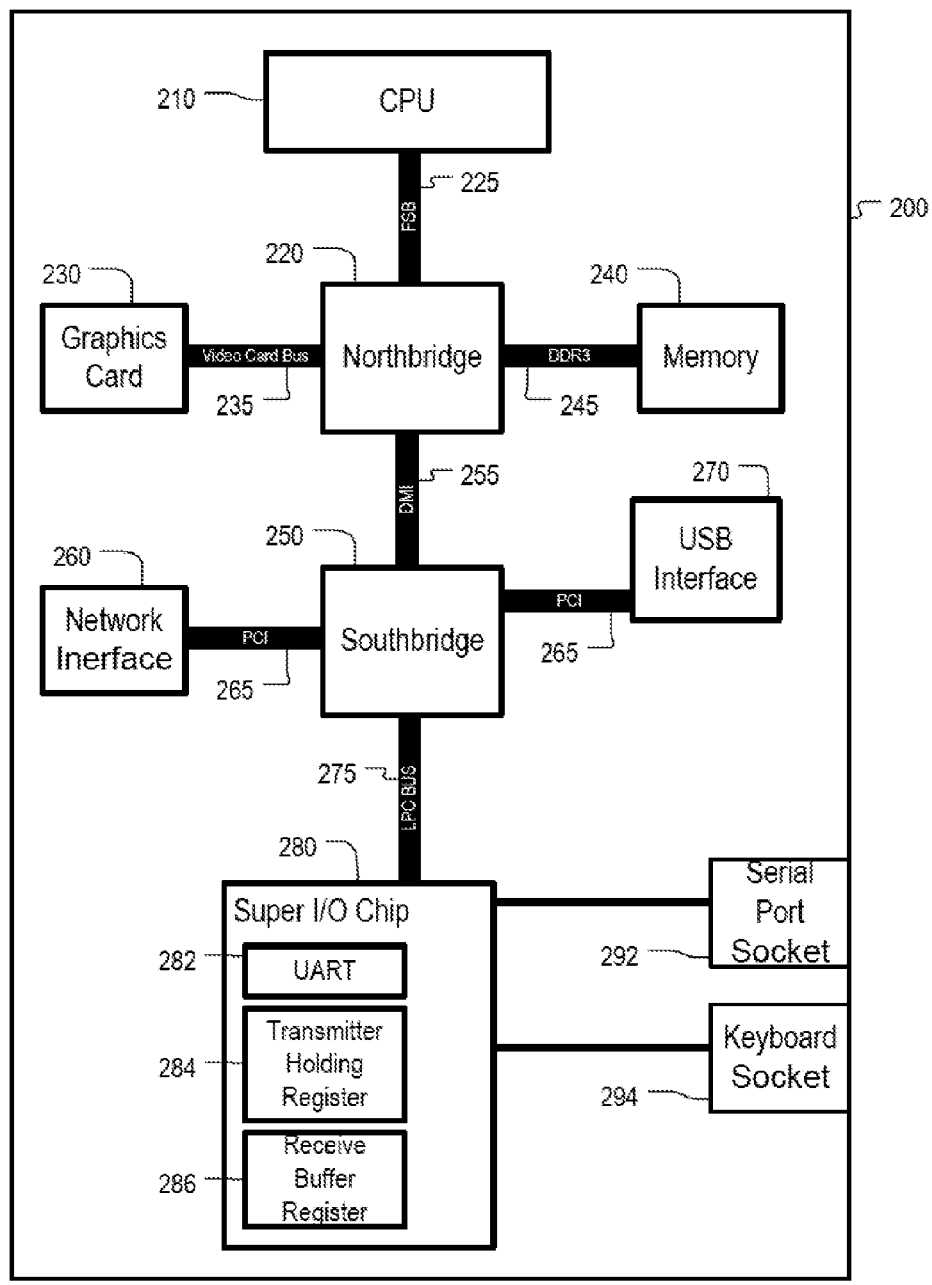
FIG. 2 depicts a schematic diagram of a conventional computer system board.

FIG. 2 depicts a schematic diagram of a known system board 200. The system board 200 includes a processor 210, a Northbridge chip 220, a graphics interface 230, a memory 240, a Southbridge chip 250, a Super I/O chip 280 and port sockets 292 and 294. The Northbridge chip 220 provides an interface between the processor 210 and other components of the system board 200. The Northbridge chip 220 is connected to the processor 210 via bus 225.

The graphics card 230 is connected to the Northbridge chip 220 via a PCI Enhanced (PCIe) bus 235. The memory 240 is connected to the Northbridge chip 220 via a DDR bus 245. The Southbridge chip 250 controls the input/output capabilities of the system board 200, and is connected to the Northbridge chip 220 via DMI bus 255. The Southbridge chip 250 is also connected to the network interface 260 and USB interface 270 via a PCI bus 275.

Super I/O chip 280 is a controller in charge of operating serial ports and PS/2 ports that are available on the system board 200. The Super I/O chip 280 includes a universal asynchronous receiver/transmitter (UART) 282 for transmitting and receiving data from the port sockets 292-294. The Super I/O chip 280 also includes a transmitter holding register (THR) 284 and a receive buffer register (RBR) 286. The processor 210 outputs data from the serial port socket 292 by writing the data in the transmitter holding register (THR) 284. Once the data is written to the THR 284, it is retrieved from there, serialized, and output by the UART 282. The Super I/O processor 280 connects to the Southbridge chip 250 via Low Pin Count (LPC) bus 275.

Figure 3:
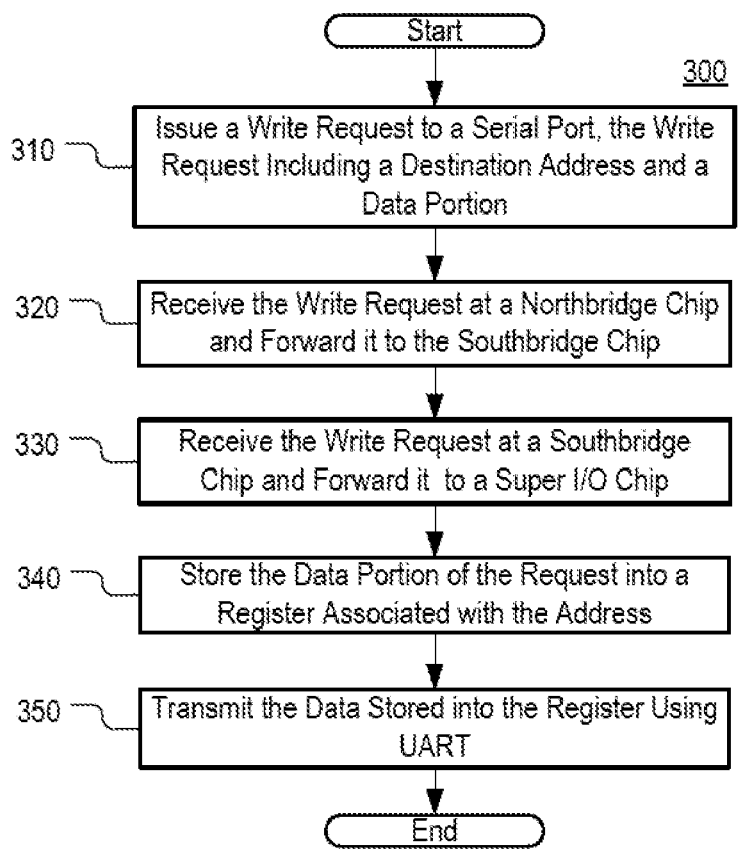
FIG. 3 depicts a flowchart of a conventional process executed by the system board of FIG. 2.

FIG. 3 depicts a flowchart of a known process 300 associated with the transmission of data via a serial port. According to the process, the processor 210 issues a write request to an address associated with the serial port 292. The write request is issued for an address associated with the transmission hold register (THR) 284 (task 310). The write request is transmitted over the front side bus (FSB) from the processor to the Northbridge chip 220. Upon receiving the write request, the Northbridge chip 220 forwards the request to the Southbridge chip 250 (task 320). Afterwards, the Southbridge chip 250 forwards the request to the Super I/O chip 280 over the LPC bus 275 (task 330). Once received, at the Super I/O chip, a data portion of the request is stored in the transmission holding register (THR) 284 (task 340). The UART 282 then retrieves the data from the transmitter holding register and transmits it out of the serial port 292 to a another device (task 350).

Figure 4:
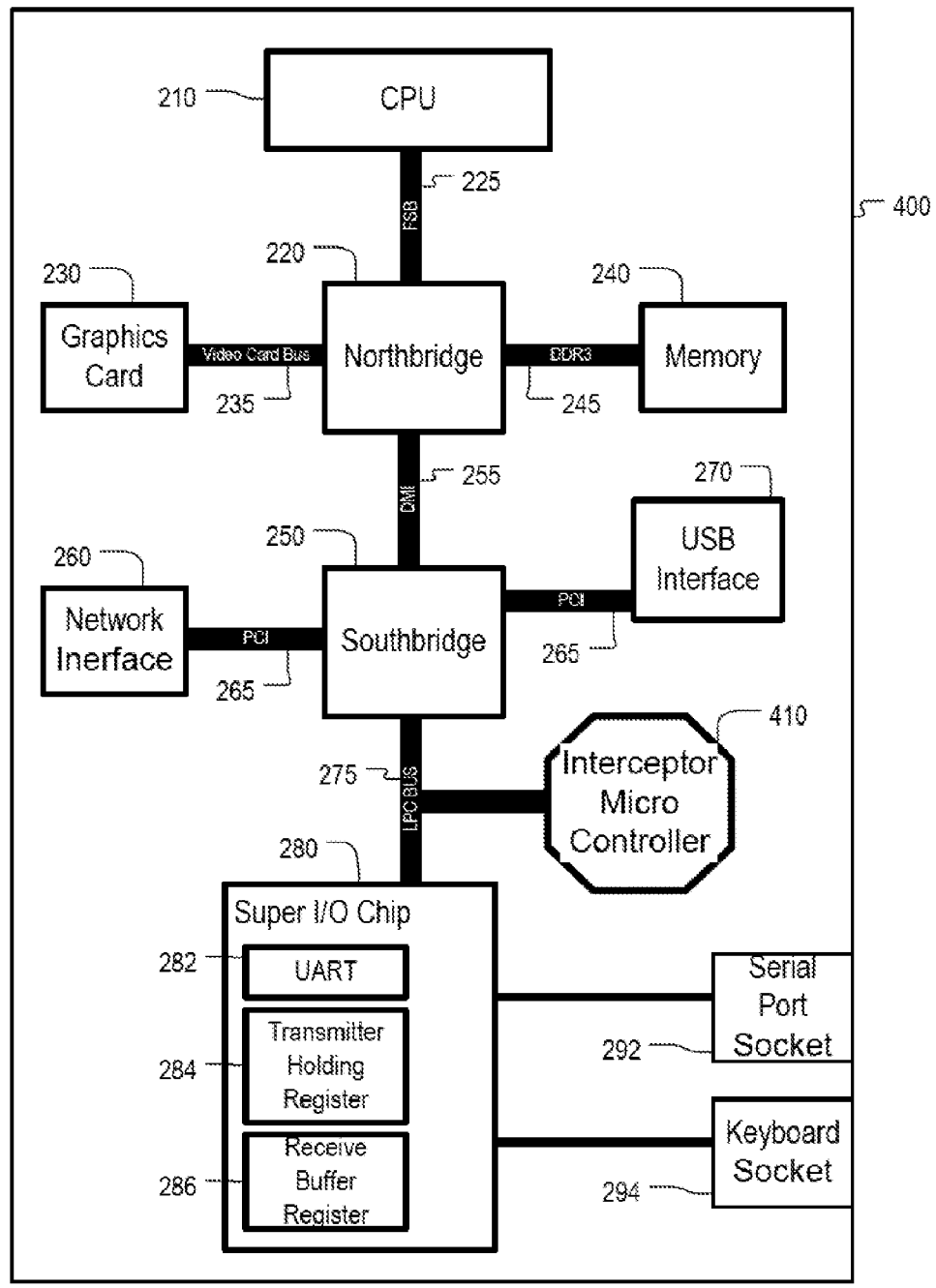
FIG. 4 depicts a schematic diagram of a system board of the prior art.

FIG. 4 depicts a schematic diagram of system board 400 of the prior art including a BMC. The system board 400 may be part of a server, switch, or any other processor-based device. Unlike the system board 300, the system board 400 may include an interceptor microcontroller 410. The interceptor microcontroller 410 may be any commercially available microcontroller or custom-made microcontroller (e.g., FPGA). The microcontroller 410 may be configured with the Super I/O 280 as a BMC to intercept write requests directed to a serial port on the system board 400 and re-transmit data that is part of those requests over another I/O interface, such as the network interface 260 or the USB interface 270. Furthermore, the microcontroller 410 may receive data over a communications network, such as the network 150, and generate hardware events based on the data. For example, the microcontroller may simulate the hardware events in such a way so that it appears that the data is entered via a keyboard or serial port.

Although in this example, the microcontroller is 410 is connected to the LPC bus 275, in other examples, it may be connected to the PCI Bus 265, the PCIe bus 235, or any other system bus of the system board 400. In these examples, the microcontroller may intercept memory writes that are made to other devices on the system board 400. For example, the microcontroller 410 may intercept VGA print requests (e.g., writes made to address 0xB8000 in the x86 instructions set architecture) and relay data from those requests via the network interface 260 to a managing terminal or another device. In that regard, data that is intended for display on a computer screen by the processor 210 may be intercepted by the microcontroller 410 and transmitted over the network 150 as text. This approach may be advantageous over capturing and transmitted screenshots of the display screen as it requires less bandwidth from the network 150.

Figure 5:
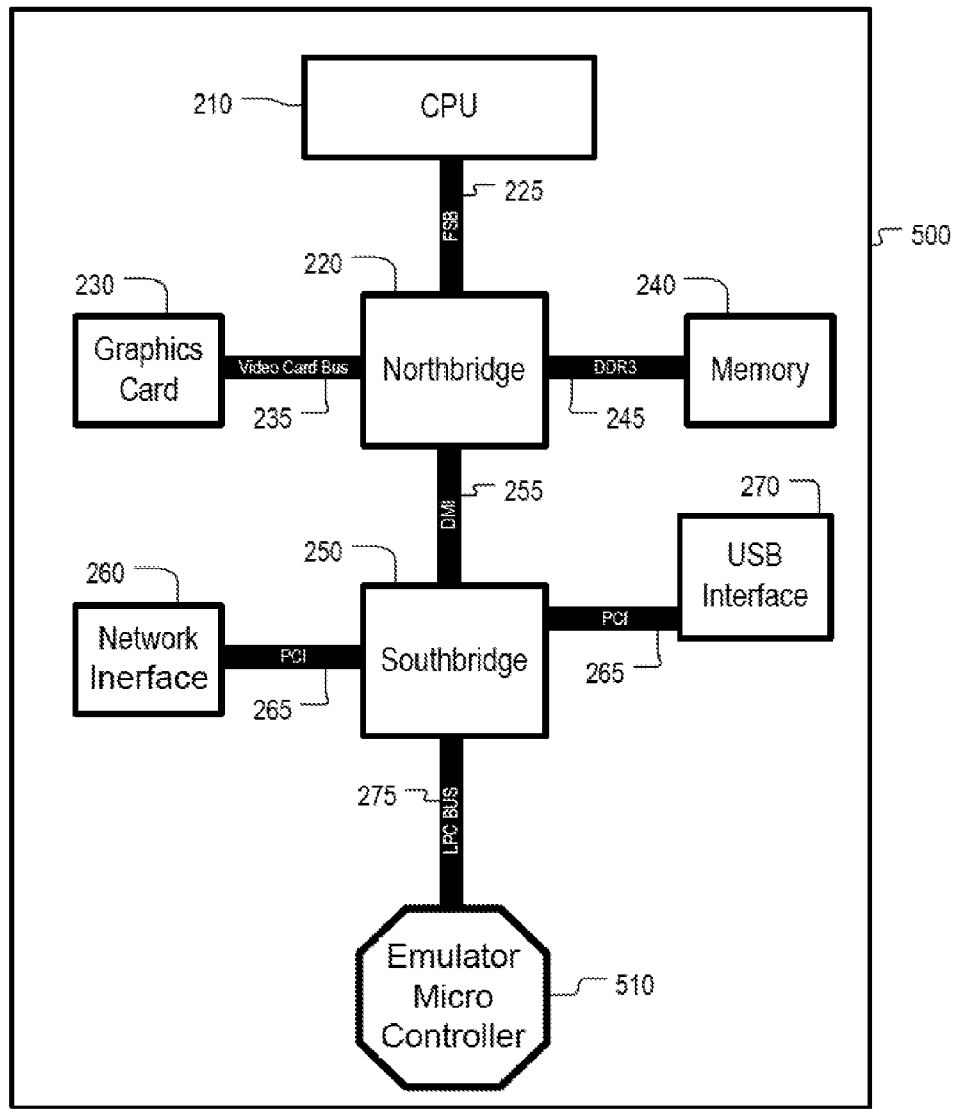
FIG. 5 depicts a schematic diagram of another system board of the prior art.

FIG. 5 depicts a schematic diagram of another system board 500. The system board 500 may be part of a server, switch, or any other processor-based device. Unlike the system board 300, the system board 500 may include an emulator microcontroller 510 and it may dispense with having a Super I/O chip and/or serial and PS/2 port sockets. The microcontroller 510 may be any commercially available microcontroller or custom-made microcontroller (e.g., FPGA).

The microcontroller 510 may be connected to the Southbridge chip 250 via the LPC bus 275 and it may be configured as a BMC to emulate the output functionality of a Super I/O chip by accepting write requests directed to registers, such as the THD 284, that are associated with I/O ports, such as serial, parallel, or PS/2. In addition, the controller 520 may be configured to transmit data that is part of these requests, via another interface to a remote device, such as a managing terminal. For example, the data may be transmitted via the network interface 260 or the USB interface 270. Although in this example, the microcontroller is 510 is connected to the LPC bus 275 and emulates a super I/O chip, in other examples it may be connected to another bus and emulate another I/O device. For example, the microcontroller 510 may be configured to emulate, at least partially, the functionality of a VGA adapter by routing video memory writes through the network interface 260. As discussed above, the memory writes directed to the VGA adapter and transmit data that is part of these requests over a communications network.

Both the examples of FIGS. 4 and 5 require particular hardware and software on the chips in order to route the information through the network interface and allow for remote communication with the system boards. Rather than having the actual or emulated display hardware or logic incorporated into the system boards, the devices or software needed to emulate those devices may be elsewhere in the data center. In this regard, the input and output operations observed on a bus may be relayed via a network to a centralized location where they may be displayed to a user. As a result, the system boards need not include the hardware or logic and thus may be more cost effective and efficient. The aspects and features discussed below provide examples of configurations which may include such benefits.

Figure 6:
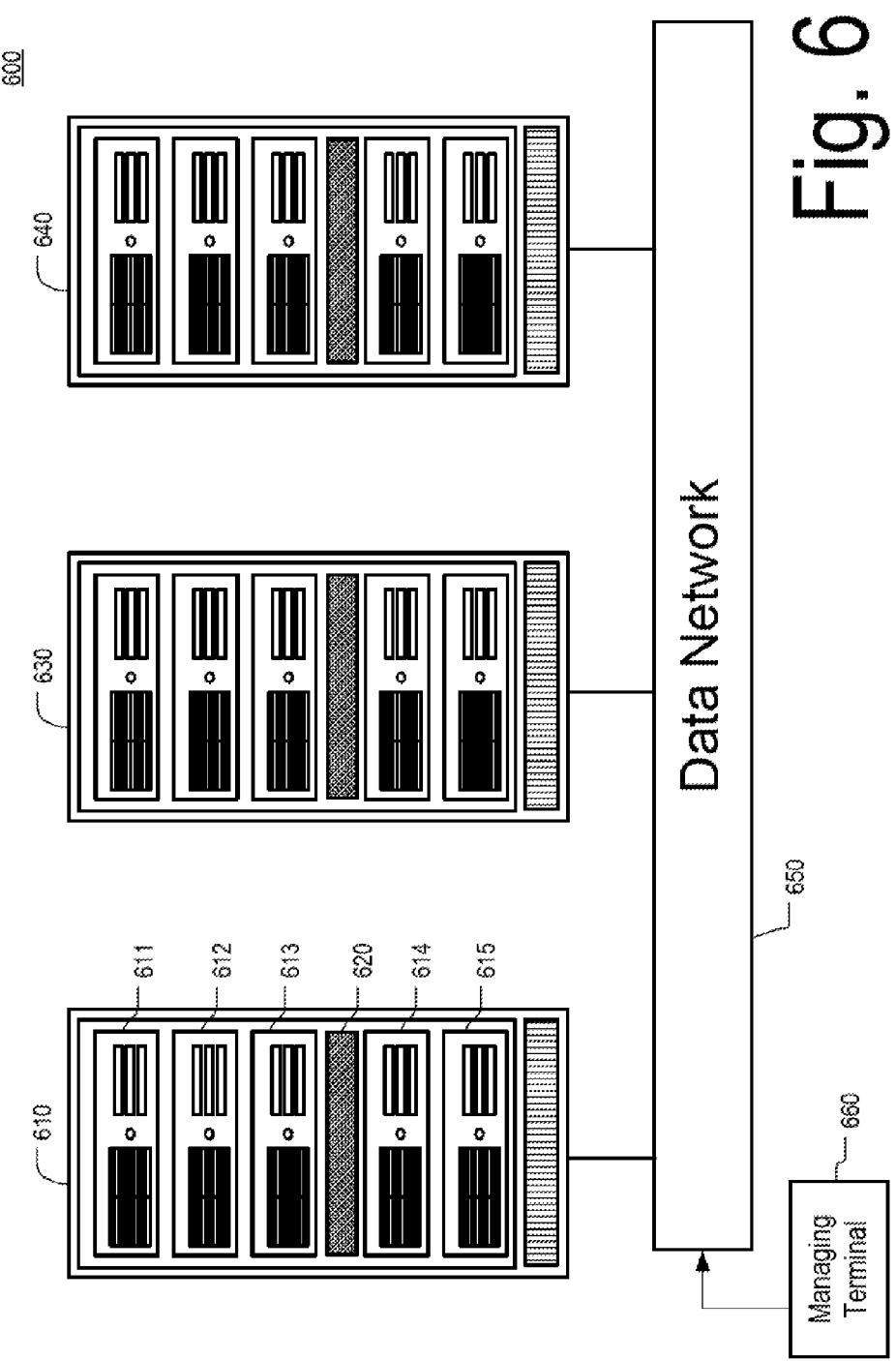
FIG. 6 depicts a schematic diagram of a data center in accordance with aspects of the disclosure.

As an example, FIG. 6 depicts a schematic diagram of an improved data center 600 in accordance with aspects of the disclosure. The data center 600 may include server racks 610, 630, and 640, a managing terminal 660, and a communications network 650. The server rack 610 may include the servers 611-615. Although FIG. 6 also includes console 620, in this example, as described in more detail below, managing terminal 660 may provide an emulated version of console 620. In this regard, data center 600 may not require or even include such consoles. Each of the servers 611-615 may include a processor, memory, and other components found in computer equipment. Unlike the data center 100, the data center 600 may include at least one piece of equipment (e.g., server or switch) that utilizes a system board, such as the system boards 400 and 500.

The console 620 may be any known console terminal. In this example, the console 620 is equivalent to the console 120 and the console 620 may be connected via a serial port switch to the servers 611-615. The managing terminal 660 may be a computing device comprising a processor, memory, as well as other components typically found in computer equipment. The managing terminal 660 may be used to remotely manage each of the servers in the data center. The managing terminal 660 may be include software capable of connecting to the servers 611-615 and changing, either in response to user input or automatically, configuration settings of software that is executing on the servers 611-615. The managing terminal 160 may be connected to the servers 611-615 via the network 650. The network 650 may include TCP/IP, 802.11, Ethernet, InfiniBand, or any other type of network.

Figure 7:
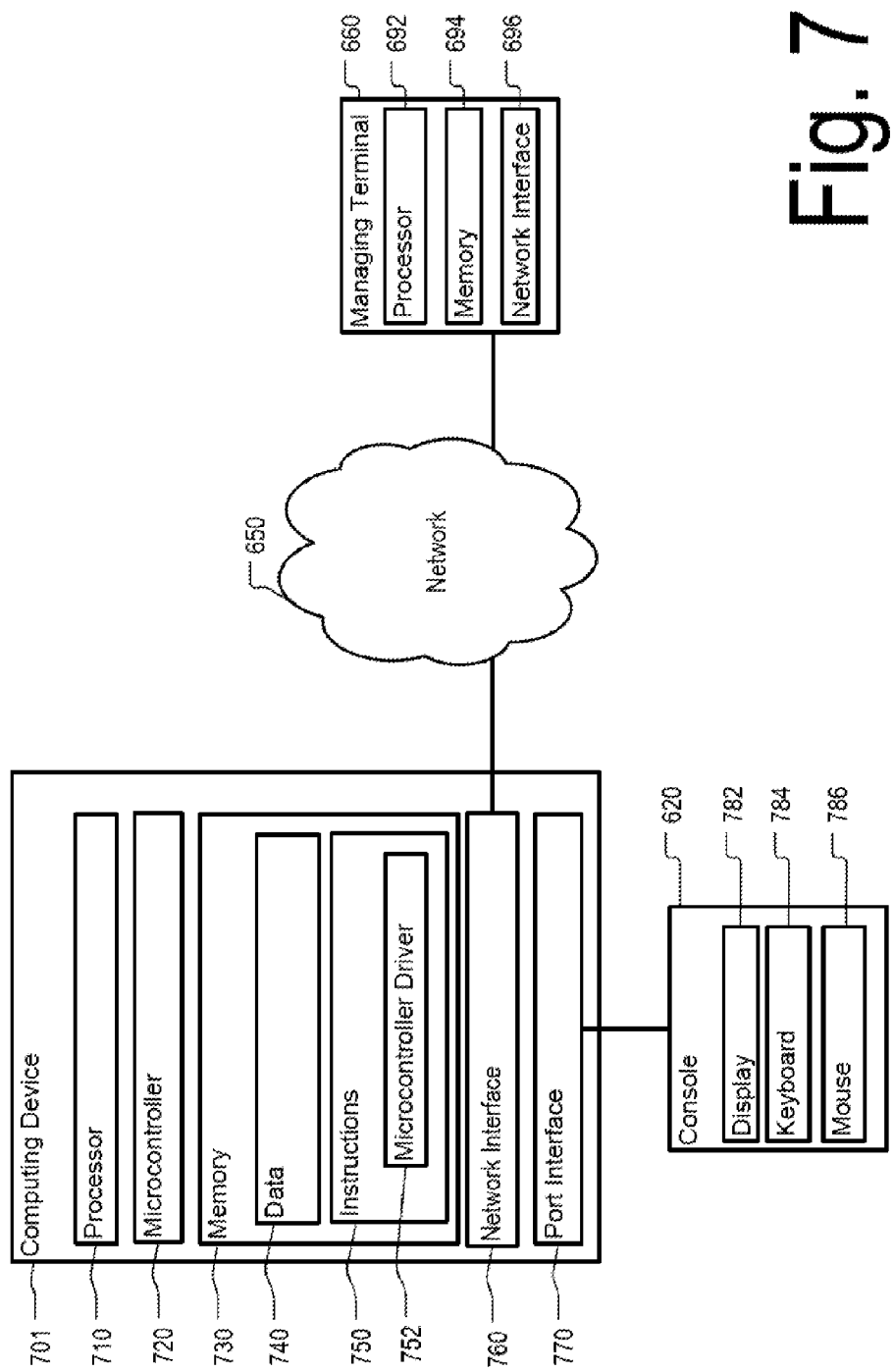
FIG. 7 depicts a schematic diagram of a portion of the data center of FIG. 6.

FIG. 7 depicts a schematic diagram or a portion of the data center 600 in accordance with aspects of the disclosure. The depicted portion includes a computing device 701, the console 620, the network 650, and the managing terminal 660. The computing device 701 may be a server, such as the server 611, a switch, or any another processor based device that is part of the data center 600 and includes one of a system board.

Although the example of computing device 701 may include any of the system boards described above, the computing device may alternatively include a system board without the display or serial logic, hardware, and/or software features of system boards 400 or 500. This again may reduce the costs of such data center equipment. In addition, when a system board having an emulator microcontroller such as emulator microcontroller 510 is used, other hardware or hardware that is used to provide the interface emulated by the microcontroller 510 (e.g., Super I/O chip, VGA chip, or port sockets) may be altogether omitted from servers and other equipment that uses the microcontroller 510. In that regard, the cost of data center equipment may even be lowered through the use of the microcontroller 510.

As illustrated, the computing device 701 may include a processor 710, a microcontroller 720, a memory 730, a network adapter 750, and a port 760. The processor 710 may be any well-known processor, such as commercially available CPUs. Alternatively, the processor may be a dedicated controller such as an ASIC. The microcontroller 720 may be any commercially-available or custom-made microcontroller, such as the microcontrollers 410 and 510.

Memory 730 stores information accessible by processor 710, including instructions 750 that may be executed by the processor 120. The memory also includes data 740 that may be retrieved, manipulated or stored by the processor. The memory may be of any type capable of storing information accessible by the processor, such as a hard-drive, memory card, ROM, RAM, DVD, CD-ROM, write-capable, and read-only memories. The memory 730 includes data 750 that may be retrieved, manipulated or stored by the processor in accordance with the instructions 740. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 750 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The driver 752 may include processor executable instructions for allowing other programs (e.g., Operating System routines) to interact with the microcontroller 720. In one aspect, the driver 752 may provide routines for configuring the microcontroller 720 to monitor traffic to and from a predetermined address. For example, the driver may include an interface (or be connected to an interface) that allows a user to specify a memory address, that the microcontroller 720 should monitor and intercept. In another aspect, the driver 752 may be routines for specifying a network address to which information intercepted by the microcontroller 710 is transmitted. In yet another aspect, the driver 752 may interact with the network interface 760 to transmit information that is intercepted and supplied to the driver 752 by the microcontroller 720.

Network interface 760 may be an Ethernet interface, WiFi interface, or any other interface for transmitting and receiving communications over the network 760. The port interface 770 may be a serial port interface, USB port interface, or any other interface for receiving and transmitting data. The port interface may be implemented as part of Super I/O chip, a Southbridge chip, or any other component of the computing device 701. In this example, the port interface 770 is a serial port interface.

The console 620 may include a display, 782, a keyboard 784, and a mouse 786. Furthermore, the console 620 may include a processor (not shown), a memory (not shown) or any other hardware typically found in computing systems. In this example, the console 620 may be connected to the computing device 701 via the port interface 770.

The managing terminal 660 may be located in a physically remote location from the computing device 701 and console 620. The managing terminal 660 may also include a processor 792, a memory 794, a network interface 796, and user input 796 such as a keyboard, mouse, touch screen, etc. The processor 792 may be a dedicated controller such as an ASIC. The memory 794 may be any volatile and non-volatile storage device, such as a random-access memory (RAM), CD-ROM, SSD, and others. The network interface 796 may be an Ethernet interface, WiFi interface, or any other interface for transmitting and receiving communications over the network 660.

Although FIG. 7 functionally illustrates the processor 792 and memory 794 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

Figure 8:
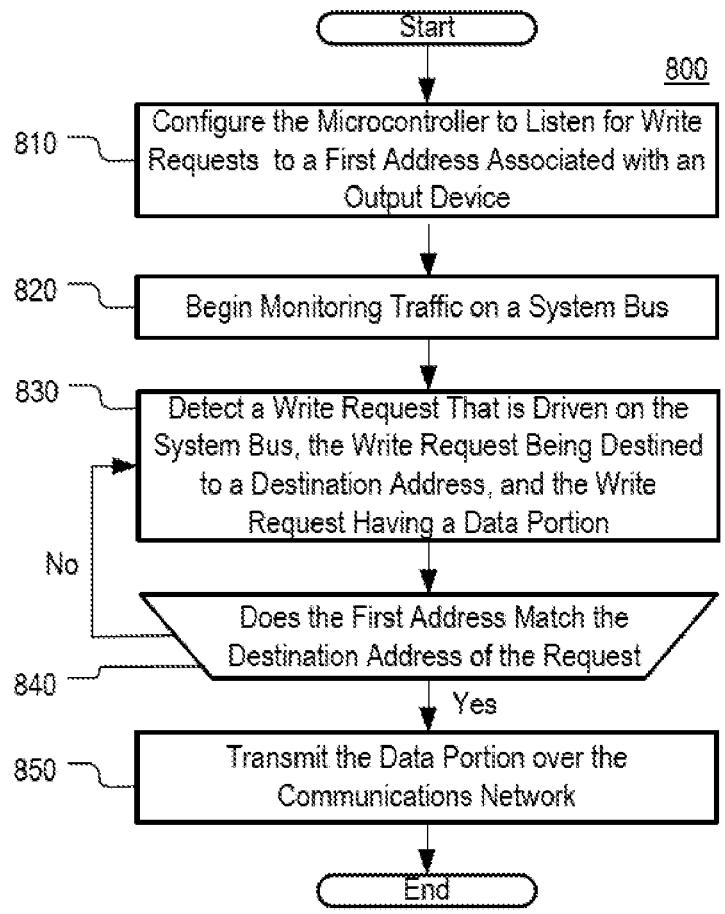
FIG. 8 depicts a flowchart of a process in accordance with aspects of the disclosure.

FIG. 8 depicts an example flowchart of a process 800 which may be executed by the computing device 701. At task 810, a microcontroller, such as the microcontroller 720, is configured to monitor write requests made by a processor, such as the processor 710, directed to a predetermined memory address or an address range of interest associated with an output device. The predetermined memory address, for example, may be a memory address associated with a serial port (e.g., the address of THR 284), a memory address associated with a USB port, a memory address associated with VGA port, a memory address associated with a graphics card, and others. In general, a memory address may be considered associated with a given I/O interface of the system board if writing data to that address would cause the data to be output by the I/O interface, such as port interface 770. The address may be part of any address space that is supported by the device executing the process 800, such as a port address space or random access memory (RAM) address space.

The predetermined memory address or address range of interest may be specified in advance by a user, for example, who may be administering or otherwise monitoring the data center. As shown in FIG. 7, user input may be input by the user at the managing terminal 660 or the console 620. The user input is then sent to the computing device 701 via port interface 770 from console 620 or network interface 760 from managing terminal 660. The user input may be received by the microcontroller via a driver that controls the operation of the microcontroller, such as the driver 752.

Returning to FIG. 8, at task 820, the microcontroller listens to or otherwise monitors traffic, such as read and write operations, on a system bus in the device executing the process 800. In this example, the system bus may be an LPC bus, such as the LPC bus 275, but in other examples, the bus may be a PCI bus, or any other bus located on a data path between a processor and an I/O interface.

At task 830, the microcontroller detects that a memory write operation is taking place on the system bus. The memory write operation may be initiated by a processor, such as the processor 710. The memory write operation may be characterized by a destination address and a data portion. The data portion may include data that is requested to be written to the memory identified by the destination address.

At task 840, the microcontroller determines whether the destination address of the write operation corresponds to the predetermined memory address or address range of interest specified at task 810. Upon a positive determination, the execution of the process 800 proceeds to task 850. Otherwise, task 830 is repeated for other write operations.

At task 850, the data portion of the write operation and the destination address are relayed over a network interface by the microcontroller. In doing so, the microcontroller may store the data portion into register located on the microcontroller or at another memory location elsewhere. The data portion and the destination address are transmitted using a secondary I/O interface to a remote terminal, such as the managing terminal 660. The data portion may be transmitted via a network interface different from the primary I/O interface associated with the address specified at task 810. Thus, if the primary I/O interface associated with the destination address is port 770, in addition to being sent via port interface 770 in accordance with the write request, the microcontroller in conjunction with the processor 710 may transmit the data portion and destination address via a secondary I/O interface such as the network interface 760, a USB interface (such as the USB interface 270 described with regard to system board 200 of FIG. 2), or any other I/O interface of the system board different from the I/O interface associated with the address specified at task 810.

In an example, the data may be transmitted by using a driver that controls the microcontroller, such as the driver 752. That is, the driver may retrieve the data portion from the memory location where it is stored by the microcontroller and transmit the data using a network interface adapter in the same way as any other software application would. Alternatively, the microcontroller may transmit the data by interacting with the network interface 760 directly without the involvement of the processor 710 (which is executing the driver), such as by using Direct Memory Access (DMA) to store the data in a memory mapped to the network interface 760 and raising an interrupt.

Figure 9:
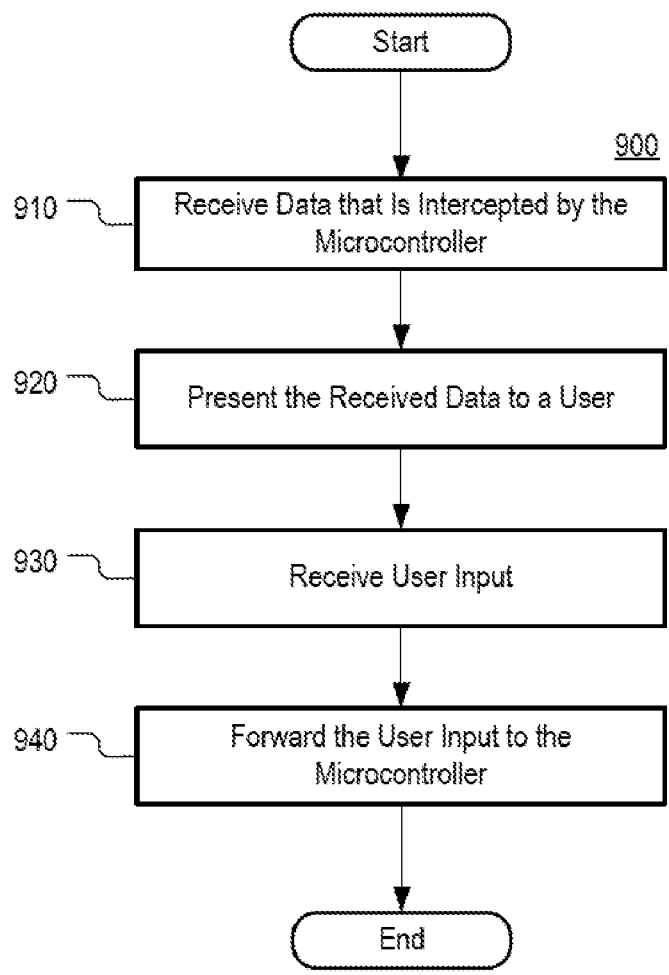
FIG. 9 depicts a flowchart of another process in accordance with aspects of the disclosure.

FIG. 9 depicts a flow chart of a process 900 associated with receiving and processing the data portion transmitted at task 850 by a managing terminal, such as the managing terminal 660. At task 910, the managing terminal 660, receives the data transmitted at task 850. At task 920, the data is presented to a user of the managing terminal or to a software application for automatically controlling the operation of equipment in a data center. At task 930, input data is received by the managing terminal. The input data may be entered by a user via a keyboard, mouse, or another input device connected to the managing terminal. Alternatively, instead of being input by a user, the input data may be generated by software for automatically controlling the operation of equipment in the data center. In some aspects, the data may be configuration data used to change the settings of software that is ran by the device executing the process 800. At task 940, the input data is transmitted to the device executing the process 800. The input data may be transmitted over a communications network, such as the network 650, USB connection, or another type of connection. In this example, the data is transmitted over a communications network.

Figure 10:
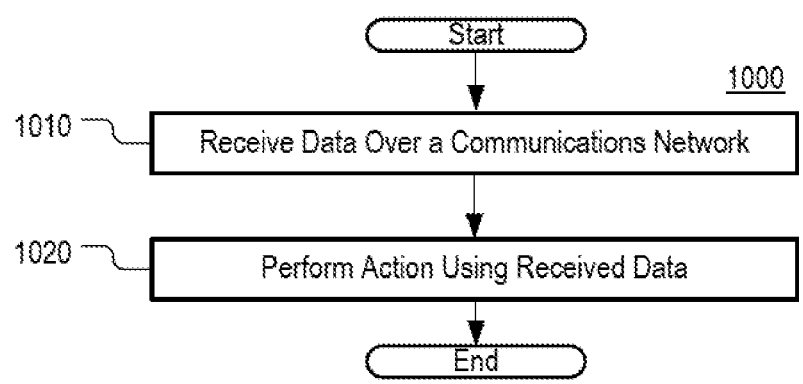
FIG. 10 depicts a flowchart of a yet another process in accordance with aspects of the disclosure.

FIG. 10 depicts a flowchart of a process 1000 associated with receiving the data transmitted at task 940 by a device executing the process 800, such as computing device 701. For example, the received data may include instructions indicating an appropriate action for the microcontroller to take next on the monitored bus. In one example, the instructions may be received over the secondary I/O interface and may include how to proceed further in transactions monitored on the bus related to the write operation having the data portion transmitted to the managing terminal. As an example, transactions may be related if they include the same destination address or an address within the address range of interest.

In another example, the action may include providing return data in response to an I/O read request. At task 1010, the data transmitted at task 940 is received by the computing device 701. At task 1020, the microcontroller (e.g., the microcontroller 720) performs an action using the received data. Using the example above, the microcontroller may respond by providing the return data.

The microcontroller may also generate a hardware event based on the received data so that it appears that the data is received over a different interface (e.g. serial port or keyboard rather than a network interface). For example, the microcontroller may simulate keyboard input by writing data to a typeahead buffer associated with the keyboard. In a further example, the device executing the process 800, such as computing device 701, may simulate serial port input (or another type of input) by using a modified interrupt service routine for handling serial port input that draws data from a memory location that is different from the location where data received via serial ports is customarily store (e.g., registers on a Super I/O chip). In the latter case, the microcontroller may simulate serial input by raising an interrupt that would cause the modified interrupted service routine to be executed.

It should be noted that FIGS. 8-10 are provided as examples. As an example, although FIGS. 8-10 relate to write operations, a similar process may be used to monitor read operations on a bus. In some aspects, at least some of the tasks associated with FIGS. 8-10 may be performed in a different order than represented, performed concurrently, or altogether omitted.

The emulation features described above may also be used in conjunction with the system boards of FIGS. 2 and 4. As Super I/O chips do not actually provide support for specific devices until each one is explicitly enabled using a specialized programming sequence specific to each type of chip, each of these chips would have to be individually programmed. However, such a configuration may be more costly in that it requires more actual hardware on the chip.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for transmitting data, the method comprising:
   accessing memory storing a predetermined memory address;
   monitoring read and write operations on a bus initiated by a processor, each memory read and write operation being associated with a first I/O interface and including a destination address and a data portion;
   determining, by a processor, whether the destination address associated with a given memory read and write operation of the memory read and write operations corresponds to the predetermined memory address;
   when the destination address associated with the given memory read and write operation corresponds to the predetermined memory address, transmitting data intercepted from the given memory read and write operation, via a second I/O interface and a communications network, to a managing terminal for processing, wherein the second I/O interface is different from the first I/O interface; and
   receiving instructions over the second I/O interface for how to proceed further in transactions over the bus related to the given memory read and write operation.

2. The method of claim 1, wherein the predetermined memory address is specified based on user input received via the second I/O interface.

3. The method of claim 1, wherein the first I/O interface is a serial port.

4. The method of claim 3, wherein the second I/O interface is a Universal Serial Bus (USB) interface.

5. A system comprising:
   a server connected to a managing terminal via a communications network, the server comprising a first input/output (I/O) interface, a microcontroller, a second input/output (I/O) interface, a memory storing a predetermined memory address, and a processor coupled to the memory and the microcontroller, wherein the second I/O interface is different from the first I/O interface, and the microcontroller is configured to:
      monitor memory write operations initiated by the processor, each memory write operation being associated with the first I/O interface and including a destination address and a data portion;
      determine whether the destination address associated with a given memory write operation of the memory write operations corresponds to the predetermined memory address;
      when the destination address associated with the given memory write operation corresponds to the predetermined memory address, transmit the data portion of the given memory write operation, via the second I/O interface and the communications network, to the managing terminal;

receive data from the managing terminal;

store the data at a predetermined memory location associated with the first I/O interface; and raise an interrupt indicating that the data has been received at the first I/O interface.

6. The system of claim 5, wherein the predetermined memory address is specified via user input received over the communications network.

7. The system of claim 5, wherein the first I/O interface is a serial port.

8. The system of claim 5, wherein the first I/O interface is a graphics port and the write request is executed by the processor as part of a VGA print operation.

9. The system of claim 5, wherein the microcontroller is connected to a system bus that is part of a data path connecting the processor to the first I/O interface.

10. The system of claim 5, wherein the predetermined memory address is one of a port address or a random access memory address.

11. The system of claim 5, further comprising the managing terminal configured to manage a plurality of servers in a data center.

12. A method for transmitting data, the method comprising:

accessing memory storing a predetermined memory address specified based on user input received at a second I/O interface;

monitoring memory write operations initiated by a processor, each memory write operation being associated with a first I/O interface and including a destination address and a data portion;

determining, by a processor, whether the destination address associated with a given memory write operation of the memory write operations corresponds to the predetermined memory address;

when the destination address associated with the given memory write operation corresponds to a predetermined memory address, transmitting the data portion associated with the given memory write operation, via the second I/O interface and a communications network, to a managing terminal, wherein the second I/O interface is different from the first I/O interface.

13. The method of claim 12, wherein the first I/O interface is a serial port.

14. The method of claim 12, wherein the first I/O interface is a graphics port and the write operation is executed by the processor as part of a VGA print operation.

15. The method of claim 12, wherein the second I/O interface is an Ethernet interface.

16. The method of claim 12, wherein the second I/O interface is a Universal Serial Bus (USB) interface.

17. The method of claim 12, wherein the predetermined memory address is one of a port address or random access memory address.

18. The method of claim 12, wherein the monitoring includes monitoring a low pin count bus.

* * * * *